May 9, 1933.  A. C. STARR  1,908,456
BRAKE
Filed June 26, 1930

INVENTOR.
Albert C. Starr
BY
J. W. McConkey
ATTORNEY

Patented May 9, 1933

1,908,456

UNITED STATES PATENT OFFICE

ALBERT C. STARR, OF NEPHI, UTAH, ASSIGNOR TO BENDIX BRAKE COMPANY, OF SOUTH BEND, INDIANA, A CORPORATION OF ILLINOIS

BRAKE

Application filed June 26, 1930. Serial No. 463,869.

This invention relates to brakes and more particularly to internal expanding brakes.

A major object of the invention is to provide a brake structure preferably of the duo-servo type wherein the shifting of the braking elements will not affect the action of the applying means.

An important feature of the invention is provide a brake of the duo-servo type with a brake applying device in which the applied force will be balanced between the respective friction elements, so that shifting of the frictional elements will not affect the action of the applying means.

An important feature of the invention is two bell crank levers pivoted to each other and adaptable for co-operation with a cam on the operating shaft of a brake for effectively spreading the shoes for engagement with the drum.

Another feature of the invention is an assembly of levers arranged in co-operative relation between the separable ends of the frictional elements to equally distribute the applied force regardless of the shifting of the elements.

Other objects and features of the invention will appear from the following description, taken in connection with the drawing which forms a part of this specification, and in which.

Figure 1:
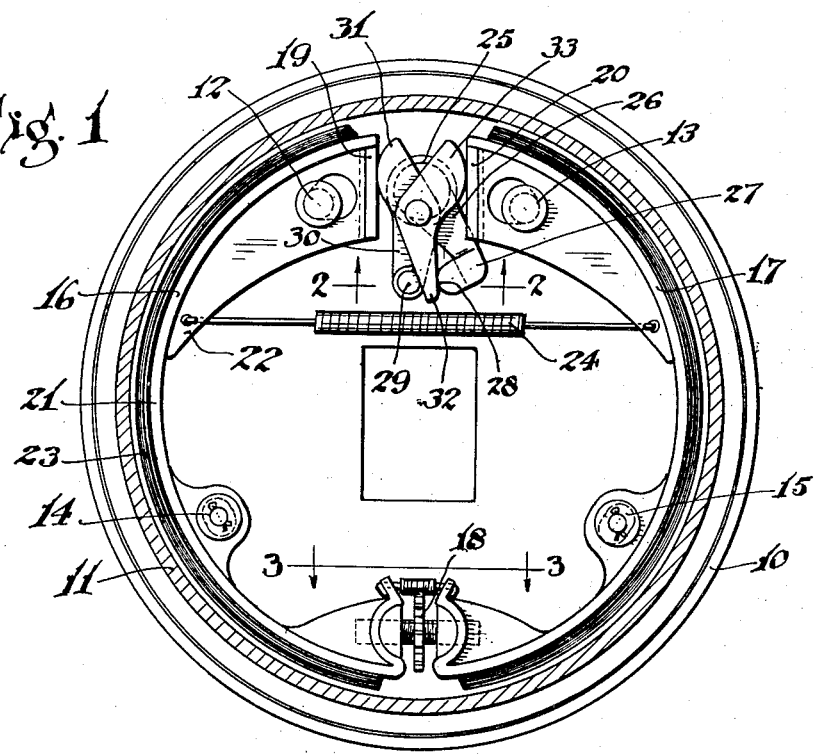
Figure 1 is a sectional view just back of the head of the drum illustrating the invention as applied.
Figure 2:
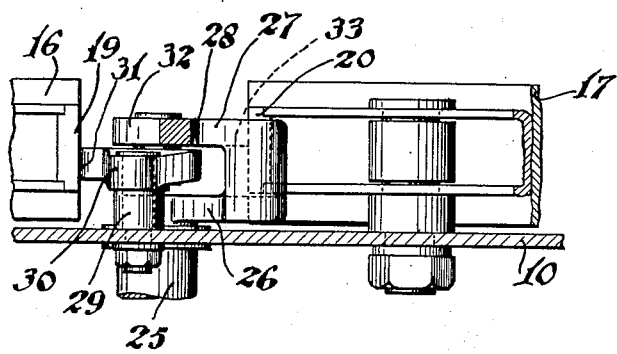
Figure 2 is a sectional view substantially on line 2—2 Figure 1.
Figure 3:
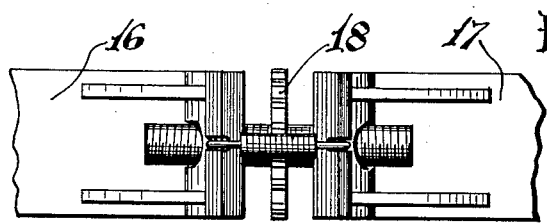
Figure 3 is a sectional view substantially on line 3—3 Figure 1.

Referring to the drawing for more specific details of the invention, 10 represents a stationary support such as a backing plate and associated with the plate is a suitable drum 11 which may be secured to a wheel, not shown.

Arranged on the backing plate are suitable anchors 12 and 13 and steady rests 14 and 15. Positioned for movement on the anchor 12 and steady rest 14 is a primary shoe 16, and positioned for movement on the anchor 13 and steady rest 15 is a secondary shoe 17. These shoes are connected at their articulated ends by a suitable adjusting device 18 and their separable ends are provided with shoulders 19 and 20.

The shoes are conventional. They comprise a rim 21 reinforced by a web 22, and a suitable lining 23 is secured to the rim for co-operating with the drum. As shown, the shoes are connected by a coil spring 24 which serves to return the shoes to the off position and to retain them, when in the off position, in proper spaced relation to the drum.

Positioned for rotation on the backing plate is an operating shaft 25 having thereon an arm or lever 26 on the free end of which is a lateral projection 27 having an engaging face 28, the object of which will hereinafter appear.

Positioned on the backing plate in spaced relation to the rotatable shaft 25 is a stud 29, having pivotally secured thereto by one end, a bell crank lever 30 the other end of which is curved, as indicated at 31, to provide a line contact with the shoulder 19 on the shoe 16. Pivotally connected to the bell crank lever 30 is a floating bell crank lever 32. This lever corresponds substantially to the lever 30, it is provided with a curved end 33 adapted to engage, by line contact, the shoulder 20 on the shoe 17.

As shown, the levers 30 and 32 are pivoted together at their apexes and the floating lever 32 is in engagement with the lateral projection on the operating lever, so that when force is applied to the operating lever the bell crank levers will be actuated to spread the shoes against the drum. It will be observed that due to the particular arrangement of the bell crank lever and to the actuation thereof by the operating lever, a balanced action is obtained so that shifting of the braking elements will not affect the applying action.

Although this invention has been described in connection with certain specific embodiments, the principles involved are susceptible to numerous other applications that will readily occur to persons skilled in the art. The invention is, therefore, to be limited only as indicated by the scope of the appended claims.

Having thus described the various features of the invention, what I claim as new and desire to secure by Letters Patent, is:

1. A brake comprising a fixed support, a rotatable drum associated therewith, articulated friction elements positioned for movement on the support and selectively anchored at their separable ends, corresponding bell crank levers pivoted together, one of the levers pivoted to a fixed support and a cam co-operating with the other lever to actuate the bell crank levers with balanced action between them to effectively spread the friction elements for engagement with the drum.

2. A brake comprising a fixed support, a rotatable drum associated therewith, articulated friction elements movably positioned on the fixed support and selectively anchored at their separable ends, corresponding bell crank levers pivoted together at their apexes, one of the levers pivoted to a fixed support, and a cam engaging the other lever adapted to actuate the levers with balanced action between them to spread the frictional elements for engagement with the drum.

3. A brake comprising a fixed support, a rotatable drum associated therewith, articulated friction elements positioned for movement on the support and selectively anchored at their separable ends, a bell crank lever having one end pivoted to the fixed support and its other end in engagement with one of the separable ends of the friction elements, another bell crank lever pivoted at its apex to the apex of the first bell crank lever having one end engaging the other separable end of the friction element, an operating shaft, an arm carried thereby and a lateral projection on the arm engaging the other end of the second bell crank lever.

4. A brake comprising a friction element having separable ends, a bell crank lever pivoted to swing between the separable ends, a second bell crank lever pivoted on the first bell crank lever, and an operating member having a sliding engagement with the second lever.

5. A brake comprising a friction element having separable ends, a pivoted bell crank lever having its free end engaging one of the separable ends of the friction element, a second bell crank lever pivoted on the first bell crank lever having one end engaging the other separable end of the friction element, an operating shaft, and an arm carried by the operating shaft having a sliding engagement with the other end of the second lever.

6. A brake-applying device comprising pivotally-connected levers, one of which is supported on a fixed pivot and which in turn supports the other and which levers have thrust portions respectively engageable with the ends of the friction means of a brake.

7. A brake-applying device comprising pivotally-connected levers, one of which is supported on a fixed pivot and which in turn supports the other and which levers have thrust portions respectively engageable with the ends of the friction means of a brake, in combination with an operating member in thrust engagement with a part of said other lever.

In testimony whereof, I have hereunto signed my name.

ALBERT C. STARR.